United States Patent
Neuendorffer

(10) Patent No.: US 8,245,243 B1
(45) Date of Patent: Aug. 14, 2012

(54) TRANSFORMING DEVICE DRIVERS TO IMPROVE EFFICIENCY

(75) Inventor: Stephen A. Neuendorffer, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 645 days.

(21) Appl. No.: 12/498,192

(22) Filed: Jul. 6, 2009

(51) Int. Cl.
*G06F 13/00* (2006.01)
*G06F 13/10* (2006.01)

(52) U.S. Cl. ........ 719/321; 719/322; 719/323; 719/324; 719/325; 719/326; 719/327; 717/168; 717/169; 717/170

(58) Field of Classification Search ............. None
See application file for complete search history.

(56) References Cited

U.S. PATENT DOCUMENTS

| | | | |
|---|---|---|---|
| 6,074,432 A | 6/2000 | Guccione | |
| 7,549,154 B2 * | 6/2009 | Rhoten et al. | 719/321 |
| 2007/0101342 A1 * | 5/2007 | Flegg et al. | 719/321 |
| 2010/0011379 A1 * | 1/2010 | Xu et al. | 719/327 |

OTHER PUBLICATIONS

IEEE-ISTO, *Power.org Standard for Embedded Power Architecture Platform Requirements (ePAPR)*, v. 1.0, Jul. 23, 2008, pp. 1-99, available from IEEE-ISTO, 445 Hoes Lane, Piscataway, New Jersey 08854, USA.
Corbet, *SMP alternatives*, posted Dec. 14, 2005, <http://lwn.net/Articles/164121/>, printed Oct. 30, 2008.

* cited by examiner

*Primary Examiner* — Qing Wu
(74) *Attorney, Agent, or Firm* — LeRoy D. Maunu

(57) ABSTRACT

Efficiency is improved for device drivers. A first library is input that includes a first version of the device drivers. First metadata is input that specifies the devices of the computing arrangement and associates each device with the first version of a corresponding device driver. The first version of the corresponding device driver for each device is transformed into a second version of the corresponding device driver. The first version of the corresponding device driver indirectly accesses the device and the second version of the corresponding device driver directly accesses the device. A second library is output including the second version of the corresponding device driver for each device.

20 Claims, 3 Drawing Sheets

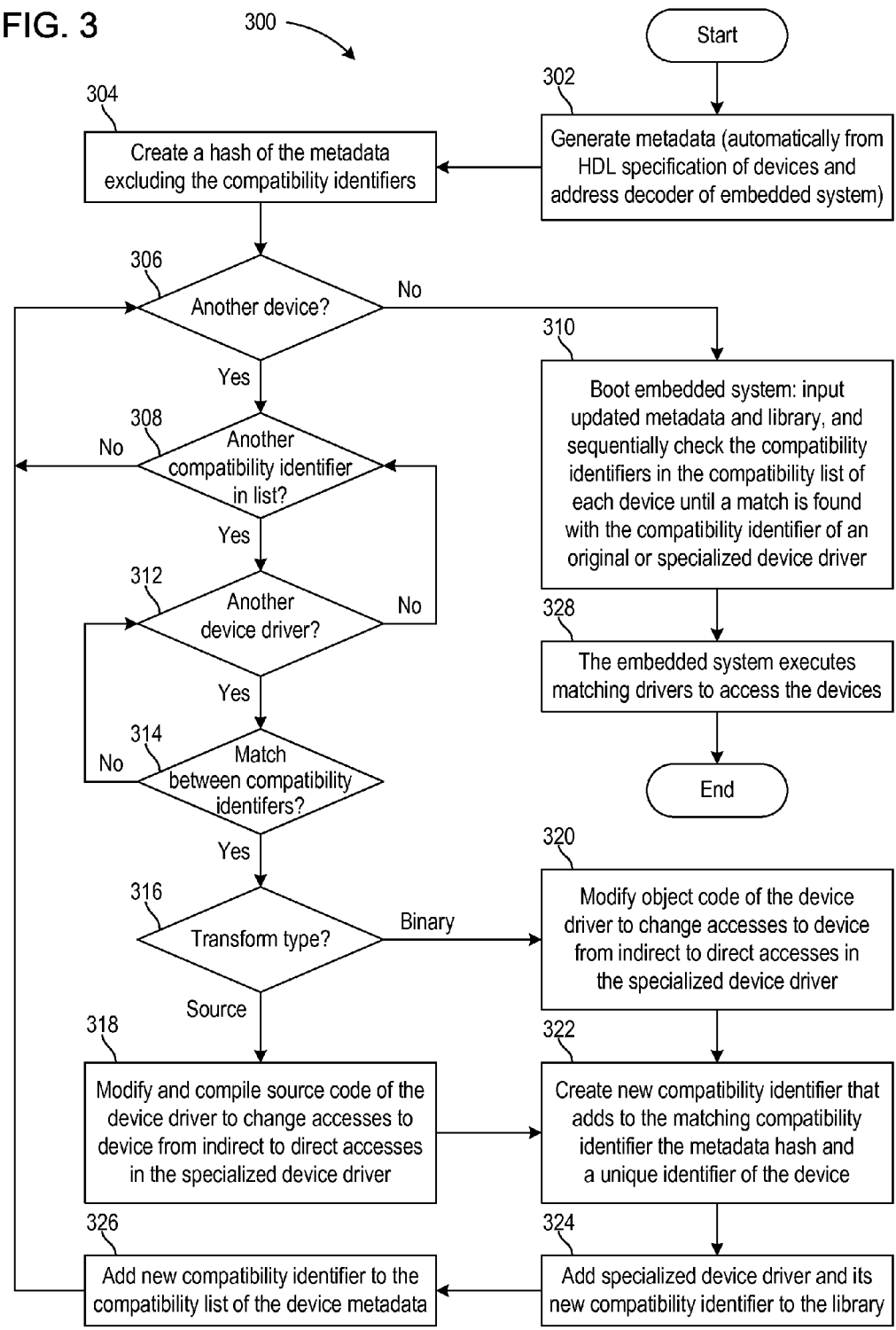

TRANSFORMING DEVICE DRIVERS TO IMPROVE EFFICIENCY

FIELD OF THE INVENTION

The present invention generally relates to computing systems, and more particularly to driver software for accessing devices in computing systems.

BACKGROUND

Computing systems range from general-purpose computing systems to embedded systems for implementing a specific function. Example devices within computing systems include input/output peripherals. Usually, computing systems execute device drivers to control the operation of these devices.

A generic device driver may be able to control many types of devices. Usually, a generic device driver accesses a data structure to access and track the state of each device controlled by the generic device driver. The overhead of these accesses to the data structure gives the generic device driver the flexibility to control many types of devices.

Embedded systems usually include device drivers customized to the actual devices included in the embedded system. However, customized device drivers make modifying the embedded system difficult and time consuming.

The present invention may address one or more of the above issues.

SUMMARY

Various embodiments of the invention improve efficiency of device drivers. A first library is input that includes a first version of the device drivers. First metadata is input that specifies the devices of the computing arrangement and associates each device with the first version of a corresponding device driver. The first version of the corresponding device driver for each device is transformed into a second version of the corresponding device driver. The first version of the corresponding device driver indirectly accesses the device and the second version of the corresponding device driver directly accesses the device. A second library is output including the second version of the corresponding device driver for each device.

Various other embodiments of the invention also improve efficiency of device drivers. A first library is input that includes a first version of each device driver and associates a first compatibility identifier with the first version of each device driver. First metadata is input that specifies the devices of a computing arrangement and associates each device with an ordered compatibility list and a portion of an address map for the computing arrangement. Each ordered compatibility list includes at least one compatibility identifier. A compatibility identifier in the ordered compatibility list for each device is matched with the first compatibility identifier associated with the first version of a corresponding device driver. The first version of the corresponding device driver for each device is transformed using the first metadata into a second version of the corresponding device driver. A second compatibility identifier is created for the second version of the corresponding device driver for each device. The second compatibility identifier for the second version of the corresponding device driver for each device is inserted into the ordered compatibility list for the device at a beginning of the ordered compatibility list. Second metadata is output that specifies the devices of the computing arrangement and associates each device with the ordered compatibility list and the portion of the address map for the computing arrangement. The ordered compatibility list includes the second compatibility identifier for the device. A second library includes the second version of the corresponding device driver for each device and associates the second compatibility identifier with the second version of the corresponding device driver for each device.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which:

FIG. 3 is a flow diagram of another process for improving efficiency of device drivers in accordance with various embodiments of the invention.

DETAILED DESCRIPTION

Figure 1:
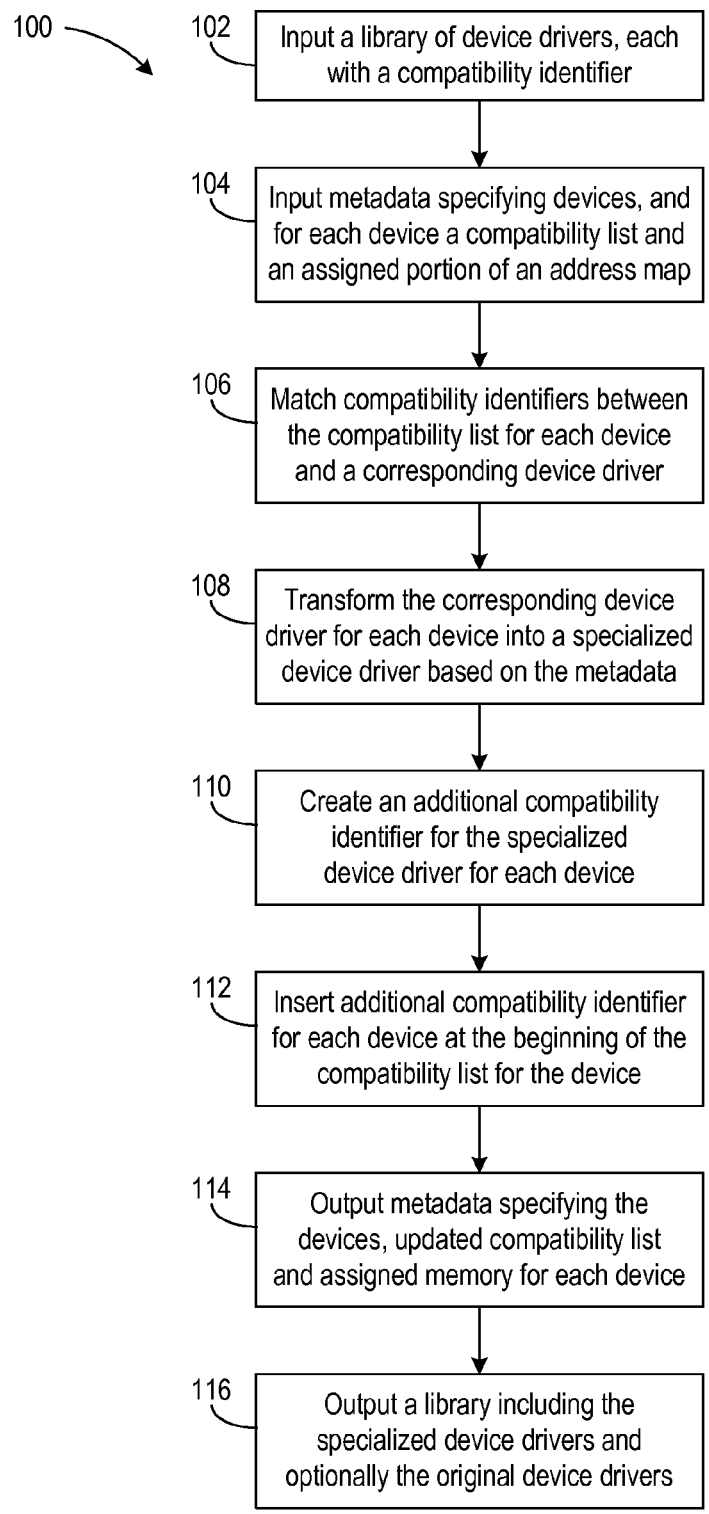
FIG. 1 is a flow diagram of a process for improving efficiency of device drivers in accordance with various embodiments of the invention.

FIG. 1 is a flow diagram of a process 100 for improving efficiency of device drivers in accordance with various embodiments of the invention. Process 100 creates customized versions of the device drivers for the devices in the system.

At step 102, a library of device drivers is input. The library associates a compatibility identifier with each device driver. At step 104, metadata is input that specifies the devices in an embedded system or another computing arrangement. The metadata also specifies a compatibility list for each device and an assigned portion of the address map for each device.

The compatibility list for a device specifies identifiers of one or more device drivers that are compatible with the device. In one embodiment, a particular device has multiple compatible device drivers and the compatibility list for the device lists the identifiers in order of preference. For example, one device driver fully operates a device and another device driver operates the device with limited functionality, and the device's compatibility list orders the compatibility identifier of the full-functionality device driver before the compatibility identifier of the limited-functionality device driver.

At step 106, each device is matched with a corresponding device driver. The identifiers in the compatibility list for each device are compared with the compatibility identifier associated with each device driver until a match is found.

At step 108, the corresponding device driver matched with each device is transformed to create a second specialized version of the device driver. The specialized version generally controls a device with better efficiency than the original version of the device driver.

In one embodiment, a computer includes many devices controlled by the original version of a specific device driver, and the device driver maintains a data structure storing the base address for accessing each controlled device. To access a device, the original device driver reads the base address from the data structure, and then uses the base address to access the device indirectly. To improve the efficiency of accessing a particular device, a specialized device driver is created that effectively includes the contents of the device's data structure. Thus, the specialized device driver accesses the device directly without first reading the base address from the data structure. For each device that a device driver indirectly accesses, a specialized version of the device driver is created to directly access the device.

At step 110, an additional compatibility identifier is created for each device's specialized version of its corresponding device driver. In one embodiment, the additional compatibility identifier adds additional identifying information to the compatibility identifier of the original device driver. At step 112, the additional compatibility identifier is added at the beginning of the compatibility list for the device. Thus, a search for compatible device drivers for the device will preferentially select the specialized version of the device driver, but the search will select the original version of the device driver if the specialized version is not available in the supplied libraries.

At step 114, modified metadata is output that specifies the devices and their updated compatibility lists and the assigned memory for each device. At step 116, a new library is output that includes the specialized versions of the device drivers and optionally includes the original version of the device drivers.

Figure 2:
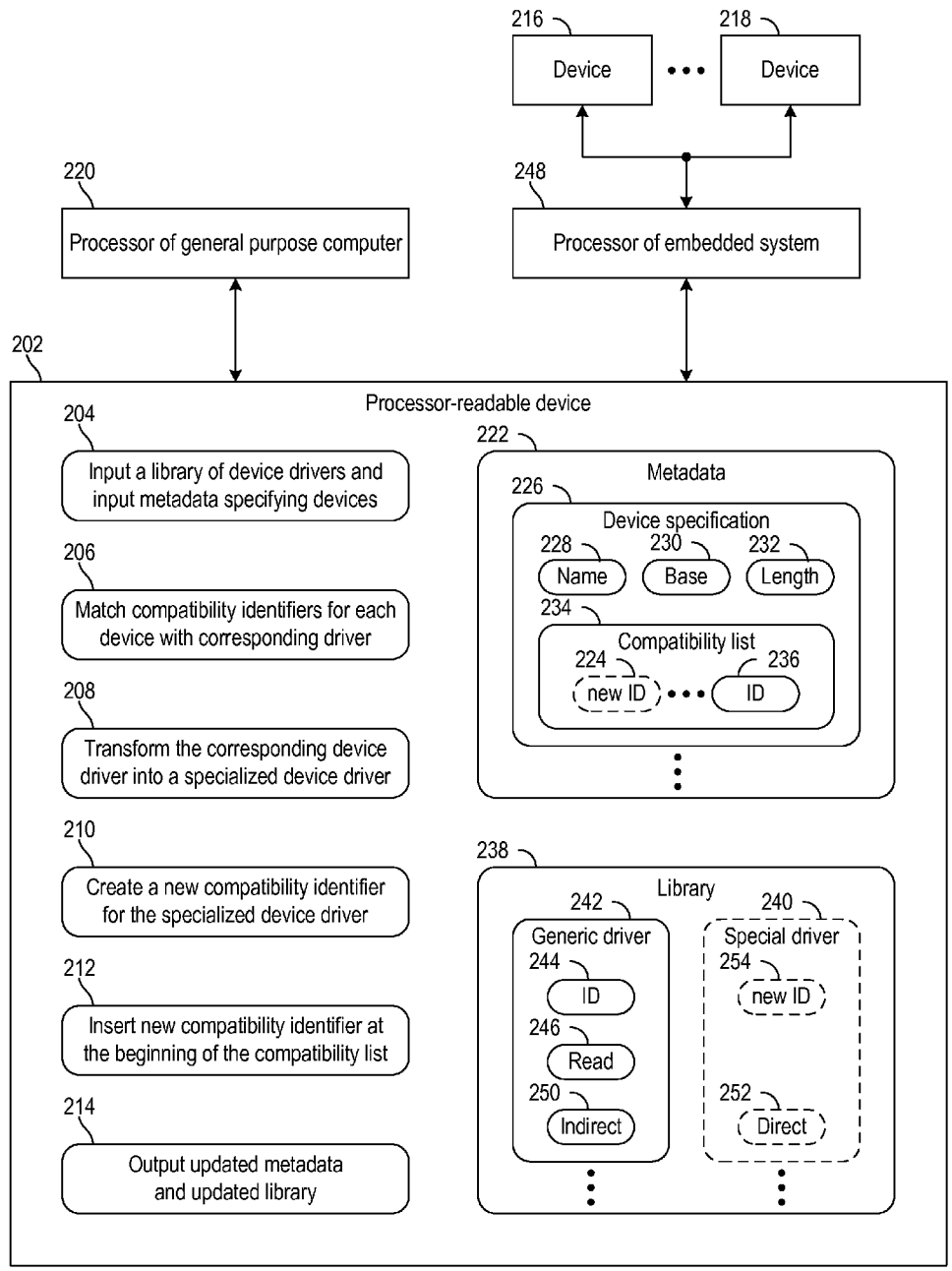
FIG. 2 is a block diagram of a system for improving efficiency of device drivers in accordance with one or more embodiments of the invention.

FIG. 2 is a block diagram of a system for improving efficiency of device drivers in accordance with one or more embodiments of the invention. Processor-readable device 202 is configured with software modules 204, 206, 208, 210, 212, and 214 for improving efficiency of device drivers. Execution of these software modules creates specialized device drivers for more efficiently managing and controlling devices 216 through 218.

Execution of the instructions in software module 204 causes processor 220 to input metadata specifying devices 216 through 218. The original metadata is similar to the updated metadata 222, but omitting the new compatibility identifiers, such as compatibility identifier 224 shown in dotted outline. The original metadata includes specifications for devices 216 through 218, including specification 226 for device 216. Specification 226 associates device 216 with a name 228 and a portion of an address map having base address 230 and length 232. Specification 226 also associates device 216 with an ordered compatibility list 234 originally including at least one compatibility identifier 236.

Execution of the instructions in software module 204 also causes processor 220 to input a library of device drivers. The original library is similar to the updated library 238, but omitting the specialized device drivers, such as specialized device driver 240 shown in dotted outline. The original library includes original device driver 242 and other original device drivers. Original device driver 242 has an associated identifier 244, such as a name of the original device driver 242.

Execution of the instructions in software module 206 causes processor 220 to match identifiers in the compatibility list for each of devices 216 through 218 with the compatibility identifier associated with a corresponding device driver from the original library. For example, device 216 has specification 226 specifying a compatibility list 234 originally including compatibility identifier 236, and if compatibility identifier 236 matches compatibility identifier 244 of original device driver 242, then original device driver 242 is compatible with device 216. The compatibility lists including list 234 for device specification 226 are ordered lists. For each device 216 through 218, each identifier in the compatibility list for that device is sequentially checked for a match with the compatibility identifier of the original device drivers until a match is found. The first matching compatibility identifier for each device 216 through 218 provides the original device driver that is preferred for that device.

Execution of the instructions in software module 208 causes processor 220 to transform the original version of the matching device driver corresponding to each device 216 through 218 into a second and more efficient version of the corresponding device driver. In one example, device 216 corresponds to original device driver 242 because compatibility identifier 236 matches compatibility identifier 244, and original device driver 242 includes a read instruction 246 that causes embedded-system processor 248 to read base address 230 from a data structure, such as updated metadata 222. Original device driver 242 also includes an access instruction 250 that causes processor 248 to access device 216 using the base address 230 read by instruction 246. Thus, original device driver 242 indirectly accesses device 216. To improve efficiency, original device driver 242 is transformed into specialized device driver 240 by removing the read instruction 246 from the original device driver 242, and by converting the indirect access instruction 250 of the original device driver 242 into a direct access instruction 252 of the specialized device driver 240. The direct access instruction 252 uses a constant value to encode the base address 230 into the specialized device driver 240, and execution of direct access instruction 252 by processor 248 causes processor 248 to directly access device 216.

There is not generally a one-to-one correspondence between the original device drivers and the specialized device drivers in updated library 238, because a particular original device driver 242 can be the preferred original device driver for multiple devices 216 through 218. Thus, in certain examples, the updated library 238 includes multiple specialized device drivers for a particular original device driver 242. In other examples, the updated library 238 does not include a specialized device driver for a particular original device driver 242 because this particular original device driver 242 is not matched to any of the devices 216 through 218.

Execution of the instructions in software module 210 causes processor 220 to create new compatibility identifiers for the new versions of the device drivers. In one embodiment, the new specialized device driver 240 has a new compatibility identifier 254 that adds extra identifying information to the compatibility identifier 244 of the corresponding original device driver 242. In one example, the new compatibility identifier 254 adds the name 228 and/or the base address 230 of the controlled device 216 to the compatibility identifier 244 of the original device driver 242.

Execution of the instructions in software module 212 causes processor 220 to insert the new compatibility identifiers into the compatibility lists for the appropriate devices 216 through 218. In one example, device 216 corresponds to original device driver 242 because compatibility identifier 236 matches compatibility identifier 244, and the original device driver 242 is transformed into specialized device driver 240 with new compatibility identifier 254. In this example, new compatibility identifier 254 is added to the beginning of the compatibility list 234 as new compatibility identifier 224. Thus, specialized device driver 240 becomes a compatible device driver for device 216, and specialized device driver 240 is also the preferred device driver for device 216 because new compatibility identifier 224 appears at the beginning of compatibility list 234. However, if the specialized device driver 240 is missing from a supplied library, the original device driver 242 will still match with device 216.

In addition, a modification of an embedded system including processor 248 and devices 216 through 218 generally causes replacement of updated metadata 222 with regenerated metadata that does not contain new compatibility identifier 224. However, there is no immediate need to generate a new library because existing library 238 will serve the devices 216 through 218 with the original generic drivers, such as original device driver 242. After generating another updated library for the modified embedded system, specialized device drivers will again be provided for devices 216-218.

Execution of the instructions in software module 214 causes processor 220 to output updated metadata 222 and updated library 238. In one embodiment, processor 230 executing software modules 204 through 214 generates and outputs updated metadata 222 and updated library 238 into processor-readable device 202, and during boot of processor 248, processor 248 matches device drivers with devices 216 through 218 using the updated metadata 222 and updated library 238. Processor 248 binds device drivers with devices 216 through 218 using in the same boot processes normally used without specialized device drivers. In another embodiment, processors 230 and 248 are the same processor creating the updated metadata 222 and updated library 238 during booting of the computing arrangement and before binding devices 216 through 218 with device drivers.

In certain embodiments, devices 216 through 218 are any device using compatibility strings or other compatibility identifiers. In one example, certain drivers are bound to a processor 248 depending on the capabilities of processor 248. A configurable processor 248, such as the MicroBlaze processor available from Xilinx, Inc., includes or omits the capability to execute certain classes of instructions depending upon the selected configuration for configurable processor 248. If the operating system and other application use a class of instructions omitted from the selected configuration, specialized drivers are created to handle the omitted instructions during booting of the operating system. This permits improved efficiency for the original device drivers in a computing arrangement that does not omit the instructions, while permitting specialized device drivers to operate properly in the computing arrangement that does omit the instructions to reduce the circuitry for implementing configurable processor 248.

FIG. 3 is a flow diagram of another process 300 for improving efficiency of device drivers in accordance with various embodiments of the invention. Specialized device drivers improve the efficiency of accessing devices.

At step 302, metadata is generated that specifies certain characteristics of the devices in a computing arrangement. In one embodiment, the computing arrangement is an embedded system specified in a hardware description language, and the metadata is automatically generated from the specification of the embedded system. The metadata specifies the devices in the embedded system and associates a portion of the address map of the embedded system to each device. The metadata also associates one or more compatibility identifiers with each device.

At step 304, a hash of the metadata is created. In one embodiment, the hash is generated from the metadata excluding the lists of compatibility identifiers.

Decision 306 checks whether the metadata specifies another device to consider. If there is another device, process 300 proceeds to decision 308; otherwise process 300 proceeds to step 310. Decision 308 checks whether the compatibility list for the current device includes another compatibility identifier. If there is another compatibility identifier, process 300 proceeds to decision 312; otherwise process 300 returns to decision 306 with the error condition of no device driver found for the current device. Decision 312 checks whether the available libraries include another device driver. If there is another device driver, process 300 proceeds to decision 314; otherwise process 300 returns to decision 308.

Decision 314 checks whether the current compatibility identifier in the compatibility list for the current device matches the compatibility identifier of the current device driver. A match indicates the current device driver is the preferred device driver compatible with the current device, and process 300 proceeds to decision 316. Otherwise, process 300 returns to decision 312.

Decision 316 determines the type of transformation for the device drivers. For source code transformation, process 300 proceeds to step 318, and for object code transformation, process 300 proceeds to step 320. At step 318, source code of the device driver is modified, and compiled to create a second version of the device driver with improved efficiency. At step 320, object code of the device driver is duplicated and modified directly. In one embodiment, an operating system of the computing arrangement detects new devices appearing while the operating system is running, and the operating system executes process 300 to dynamically create a specialized device driver for the new device before binding the device to the specialized device driver.

In one embodiment, the improved efficiency comes from changing accesses to the device by the device driver from indirect accesses to direct accesses. In another embodiment, the device includes a features register and the value of the features register is encoded in the second version of the device driver to eliminate the need for the device driver to read the features register of the device.

At step 322, a new capability identifier is created that adds the hash from step 304 to the capability identifier matched at decision 314. In one embodiment, the new capability identifier also or instead adds an identifier that uniquely identifies the device in the computing arrangement. Example unique identifiers include a name of the device and/or a base address of the device in the computing arrangement.

At step 324, the second version of the device driver for the device is added to the library along with the new capability identifier for the second version of the device driver. At step 326, the new capability identifier is added to the compatibility list in the metadata for the current device. Process 300 then returns to decision 306 to check whether the computing arrangement includes another device needing a specialized device driver.

At step 310, the computing arrangement is initialized. In one embodiment, initialization of an embedded system includes inputting the updated metadata and the updated library, and sequentially checking the identifiers in the compatibility list for each device until a match is found with the compatibility identifier of the first or second versions of a device driver.

At step 328, the computing arrangement accesses the devices using the matching drivers. In one embodiment, a processor of an embedded system executes the matching drivers and instructions in these matching drivers cause this processor to access the devices. If a matching driver is the second and specialized version of a device driver instead of the first and original version of a device driver, the specialized device driver accesses the device with improved efficiency. If an appropriate specialized version of the device driver is not available in the library for a particular device, the embedded system uses the original version of the device driver to access the particular device successfully, but without improved efficiency.

Those skilled in the art will appreciate that various alternative computing systems, including one or more processors and a memory arrangement configured with program code, would be suitable for hosting the processes and data structures and implementing the algorithms of the different embodiments of the present invention. In addition, program code that implements the processes may be provided via a variety of computer-readable storage media or delivery channels such as magnetic or optical disks or tapes, electronic storage devices, or as application services over a network.

Such a computing system would include one or more processors coupled to a memory/storage arrangement. The architecture of the computing arrangement depends on implementation requirements as would be recognized by those skilled in the art. The processor may be one or more general purpose processors, or a combination of one or more general purpose processors and suitable co-processors, or one or more specialized processors (e.g., RISC, pipelined, etc.).

The memory/storage arrangement may include hierarchical storage commonly found in computing systems. Such hierarchical storage typically includes multiple levels of cache memory, a main memory, and local and/or remote persistent storage such as provided by magnetic disks (not shown). The memory/storage arrangement may include one or both of local and remote memory/storage, remote storage being coupled to the processor arrangement via a local area network, for example.

The present invention is thought to be applicable to a variety of systems for improving efficiency of device drivers. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for improving efficiency of a plurality of device drivers, comprising:
   executing program code on a computing system and causing the computing system to perform operations including:
      inputting a first library including a first version of each of the device drivers;
      inputting first metadata that specifies a plurality of devices of a computing arrangement and associates each of the devices with the first version of a corresponding one of the device drivers;
      transforming the first version of the corresponding device driver for each of the devices into a second version of the corresponding device driver, wherein the first version of the corresponding device driver indirectly accesses the device and the second version of the corresponding device driver directly accesses the device; and
      outputting a second library including the second version of the corresponding device driver for each of the devices.

2. The method of claim 1, the operations further comprising:
   outputting second metadata that specifies the devices of the computing arrangement and associates each of the devices with the second and first versions of the corresponding device driver; and
   wherein the outputting of the second library includes outputting the second library including the first version of each of the device drivers and the second version of the corresponding device driver for each of the devices.

3. A method for improving efficiency of a plurality of device drivers, comprising:
   executing program code on a computing system and causing the computing system to perform the operations including:
      inputting a first library including a first version of each of the device drivers and associating a first compatibility identifier with the first version of each of the device drivers;
      inputting first metadata specifying a plurality of devices of a computing arrangement and associating each of the devices with a respective ordered compatibility list and a respective portion of an address map for the computing arrangement, wherein the respective ordered compatibility list includes at least one compatibility identifier;
      for each of the devices, matching the at least one compatibility identifier of the respective ordered compatibility list for the device with the first compatibility identifier associated with the first version of a corresponding one of the device drivers;
      for each of the devices, transforming, in response to the first metadata, the first version of the corresponding device driver for the device into a second version of the corresponding device driver for the device;
      for each of the devices, creating a second compatibility identifier for the second version of the corresponding device driver for the device;
      for each of the devices, inserting the second compatibility identifier for the second version of the corresponding device driver for the device into the respective ordered compatibility list for the device at a beginning of the respective ordered compatibility list;
      outputting second metadata specifying the devices of the computing arrangement and associating each of the devices with the respective ordered compatibility list and the respective portion of the address map for the computing arrangement, wherein the respective ordered compatibility list includes the second compatibility identifier for the device; and
      outputting a second library including the second version of the corresponding device driver for each of the devices and associating the second compatibility identifier with the second version of the corresponding device driver for each of the devices.

4. The method of claim 3, the operations further comprising booting the computing arrangement, wherein the booting includes:
   inputting the second metadata and the second library including the first version of the device drivers and the second version of the corresponding device driver for each of the devices;
   for each of the devices specified in the second metadata, sequentially checking the compatibility identifiers in the respective ordered compatibility list for the device until one of the compatibility identifiers matches the compatibility identifier associated with one of the versions of the device drivers from the second library; and
   for each of the devices, accessing the device using the one of the versions of the device drivers.

5. The method of claim 4, wherein the one of the compatibility identifiers in the respective ordered compatibility list for the device is the second compatibility identifier associated with the second version of the corresponding device driver for the device, and the second version of the corresponding device driver for the device is the one of the versions of the device drivers.

6. The method of claim 4, wherein the one of the compatibility identifiers in the respective ordered compatibility list for the device is the first compatibility identifier associated with the first version of the corresponding device driver for the device, and the first version of the corresponding device driver is the one of the versions of the device drivers.

7. The method of claim 4, wherein the booting further includes performing the steps of the inputting of the first library, the inputting of the first metadata, the matching of the at least one compatibility identifier for each device with the first compatibility identifier, the transforming of the first version of the corresponding device driver for each device into the second version of the corresponding device driver, the creating of the second compatibility identifier for each device, and the inserting of the second compatibility identifier for each device into the respective ordered compatibility list for the device.

8. The method of claim 3, wherein the inputting of the first metadata includes automatically generating the first metadata from a specification of the computing arrangement in a hardware description language, the specification specifying the devices and the address map.

9. The method of claim 3, wherein, for each of the devices, the matching of the at least one compatibility identifier with the first compatibility identifier includes sequentially checking each compatibility identifier in the respective ordered compatibility list for the device until the compatibility identifier matches the first compatibility identifier associated with the first version of the corresponding device driver from the first library.

10. The method of claim 3, wherein the transforming of the first version of the corresponding device driver for each of the devices into the second version of the corresponding device driver includes transforming the first version of the corresponding device driver that indirectly accesses the device into the second version of the corresponding device driver that directly accesses the device.

11. The method of claim 10, wherein, for each of the devices, the first version of the corresponding device driver for the device obtains an address value returned from a read of a location in a memory of the computing arrangement and the first version of the corresponding device driver indirectly accesses the device using the address value that addresses the respective portion of the address map, and the second version of the corresponding device driver includes the address value and directly accesses the device using the address value without reading the address value from the location in the memory.

12. The method of claim 11, wherein the transforming of the first version of the corresponding device driver for each of the devices into the second version of the corresponding device driver includes generating the second version of the corresponding device driver from a modification of the first version of the corresponding device driver, the modification deleting the read from the first version of the corresponding device driver.

13. The method of claim 3, wherein the transforming of the first version of the corresponding device driver for each of the devices into the second version of the corresponding device driver includes producing source code for the second version of the corresponding device driver from a modification of source code for the first version of the device driver, and compiling the source code for the second version of the corresponding device driver into object code of the second version of the corresponding device driver.

14. The method of claim 3, wherein the transforming of the first version of the corresponding device driver for each of the devices into the second version of the corresponding device driver includes producing object code for the second version of the corresponding device driver from a modification of object code for the first version of the device driver.

15. The method of claim 3, wherein the creating of the second compatibility identifier for each of the devices includes adding a hash of the second metadata onto the first compatibility identifier associated with the first version of the corresponding device driver for the device.

16. The method of claim 15, wherein the adding of the hash of the second metadata includes generating the hash of the second metadata excluding the respective ordered compatibility list for each of the devices.

17. The method of claim 15, wherein the creating of the second compatibility identifier for each of the devices includes further adding another hash onto the first compatibility identifier associated with the first version of the corresponding device driver for the device, the another hash being a hash of a unique identifier of the device in the computing arrangement, and the unique identifier is one of a name of the device and a base address value of the respective portion of the address map for the device.

18. A program storage medium, comprising:
a processor-readable storage device configured with instructions for improving efficiency of a plurality of device drivers, wherein execution of the instructions by one or more processors causes the one or more processors to perform operations including:
inputting a first library including a first version of each of the device drivers and associating a first compatibility identifier with the first version of each of the device drivers;
inputting first metadata specifying a plurality of devices of a computing arrangement and associating each of the devices with a respective ordered compatibility list and a respective portion of an address map for the computing arrangement, wherein the respective ordered compatibility list includes at least one compatibility identifier;
for each of the devices, matching the at least one compatibility identifier of the respective ordered compatibility list for the device with the first compatibility identifier associated with a first version of a corresponding one of the device drivers;
for each of the devices, transforming, in response to the first metadata, the first version of the corresponding device driver for the device into a second version of the corresponding device driver for the devices;
for each of the devices, creating a second compatibility identifier for the second version of the corresponding device driver for the device;
for each of the devices, inserting the second compatibility identifier for the second version of the corresponding device driver for the device into the respective ordered compatibility list for the device at a beginning of the respective ordered compatibility list;
outputting second metadata specifying the devices of the computing arrangement and associating each of the devices with the respective ordered compatibility list and the respective portion of the address map for the computing arrangement, wherein the respective ordered compatibility list includes the second compatibility identifier for the device; and
outputting a second library including the first version of the device drivers and the second version of the corresponding device driver for each of the devices, and associating the second compatibility identifier with the second version of the corresponding device driver for each of the devices.

19. The program storage medium of claim 18, wherein the one or more processors performing the operations of the outputting of the second metadata and the second library includes the one or more processors storing the second metadata and the second library in the processor-readable device, and execution of the instructions by the computing arrangement causes the computing arrangement to perform operations including:

inputting the second metadata and the second library from the processor-readable device;

for each of the devices specified in the second metadata, sequentially checking the compatibility identifiers in the respective ordered compatibility list for the device until one of the compatibility identifiers matches the compatibility identifier associated with one of the versions of the device drivers from the second library; and for each of the devices, executing the one of the versions of the device drivers, wherein the executing includes accessing the device.

20. The program storage medium of claim 18, wherein the transforming of the first version of the corresponding device driver for each of the devices into the second version of the corresponding device driver includes transforming the first version of the corresponding device driver that indirectly accesses the device into the second version of the corresponding device driver that directly accesses the device.

* * * * *